United States Patent [19]

Price

[11] 4,128,979
[45] Dec. 12, 1978

[54] SUSPENSION ASSEMBLY FOR PARTITION PANEL

[76] Inventor: Reginald S. Price, 3228 - 6th St. SW., Calgary, Alberta, Canada, T2S 2M3

[21] Appl. No.: 800,750

[22] Filed: May 26, 1977

[51] Int. Cl.$^2$ .................... E04H 1/00; A43B 23/20
[52] U.S. Cl. ................................... 52/241; 52/481; 85/13
[58] Field of Search .............. 52/489, 481, 238, 241, 52/98; 85/11, 13

[56] References Cited

U.S. PATENT DOCUMENTS

| | | | |
|---|---|---|---|
| 1,810,597 | 6/1931 | Corwin | 52/489 |
| 2,101,001 | 11/1937 | Balduf | 52/489 |
| 2,277,758 | 3/1942 | Hawkins | 85/13 |
| 2,293,862 | 8/1942 | Sorewson | 85/13 |
| 2,396,030 | 3/1946 | Terry | 85/13 |
| 3,416,821 | 12/1968 | Benno | 85/13 |
| 3,948,011 | 4/1976 | Price | 85/13 |

*Primary Examiner*—John E. Murtagh
*Attorney, Agent, or Firm*—Ernest Peter Johnson

[57] ABSTRACT

A suspension assembly for suspending a gypsum board panel from a channel member of a support structure comprises a plate having a plurality of panel-piercing members extending from one face. The plate has upper and lower portions with a transverse line of weakness extending across the plate adjacent the upper end of the lower portion. A separate suspension clip is attached to the plate above the line of weakness, a lower portion of the clip situated below the level of the line of weakness being inclined outwardly from the plane of the plate to form a cam surface which engages over a side leg of the channel member. Under the applied loads, the clip causes the plate to bend about the line of weakness in a sense to incline the panel-piercing members of the lower plate portion in an upwards direction. This inclination prevents the panel-piercing members from being drawn out of the panel during use.

13 Claims, 4 Drawing Figures

SUSPENSION ASSEMBLY FOR PARTITION PANEL

BACKGROUND OF THE INVENTION

1. Field of the Invention

The invention relates to a suspension assembly for suspending a gypsum board panel from a support structure, to a combination of the suspension assembly with a gypsum board panel, and to a non-load bearing partition wall utilizing these components.

2. Description of the Prior Art

In recent years, removable partition walls have been widely used in buildings. In general these walls involve mounting channel-like runners on the floor and ceiling, installing vertical, channel-like studs in laterally spaced relationship between the runners, and securing gypsum board or the like panels to the studs. The panels can be screwed or glued to the studs to provide a sturdy wall. However, this technique is labor intensive. It involves having to fill and tape the joints and conceal them with battens in order to produce a neat, finished appearance.

A battenless system has been developed which is described in U.S. Pat. No. 3,550,338 issued to Satkin et al. This system involves securing long metal strips with adhesive to the back of a gypsum board panel. The strips are located along each vertical side edge. Hooks protrude rearwardly from each strip. These hooks engage cut-outs in the side leg of the adjacent metal channel stud. Each hook has a cam surface, which coacts with the side edges of the cut-out to draw the panel tightly against the stud as the panel is lowered into place. The hooks suspend the panel a short distance above the floor so that the panel weight acts to hold it in place.

The metal strips which are used in this prior system must be of substantial length and width. This requirement arises from a characteristic of gypsum board panel that the bond between the board filling and the paper layer is frequently weaker in certain portions of the panel than in others. By providing long, wide strips, at least portions of each strip will be attached to properly bonded material. One disadvantage in using such strips is that they are relatively expensive and thus contribute significantly to the cost of the system.

The metal strips, hooks and stud cut-outs of this prior system must be precisely manufactured and positioned. This is done so that they match perfectly and draw adjacent panels into closely abutting relation. The resulting joint is, under this circumstance, a line and not an unsightly gap. This precise manufacturing also contributes to the cost of the system.

Another limitation of this type of system is that considerable stress due to the weight of the panels is placed on a narrow section of the stud. This leads to sagging and weakening of the lateral stability of the wall. Reinforcing to overcome this problem is usually not added because of the increased cost.

With a view to overcoming the limitations of this type of system we have devised a system in which gypsum board panels are suspended from horizontal channel members by a number of suspension assemblies comprising gang nail plates affixed to the rear face of each panel and carrying a hanger member having a lower inclined or cam portion which co-operates with a side leg of the horizontal channel member to draw the panel firmly against an adjacent vertical stud member. By suspending the panels from horizontal channel members, it is possible to use panels having loose tolerances in their dimensions and to shift the panels laterally along the horizontal channel members to achieve a close abutment and what may be termed line joints. This system is disclosed in our Canadian Pat. No. 1,002,279 issued on Dec. 28, 1976.

As disclosed in our Canadian Pat. No. 1,002,279 each gang nail plate comprises a plate having a plurality of integral, panel-piercing, non-threaded tangs projecting from the plate. The gang nail plates are attached to the panel simply by placing each plate on the back of the panel and driving the plate against the panel so that the tangs pierce the panel to a substantial depth, but without protruding from the front face thereof. The gang nail plates are relatively inexpensive and are easily attached to the back of the panel using simple mechanical means.

In the suspension assemblies of our previously proposed system, the cam portion of the hanger member projects downwardly beyond the bottom edge of the plate. While this configuration has been found to work satisfactorily with dense gypsum board panels, such as Western Canadian gypsum panels, the plate is not always effective when applied to gypsum board panels, such as Eastern Canadian gypsum panels, which are considerably less dense due to the use of a different raw gypsum material. More particularly, when the plate is applied to less dense gypsum panels, it has been found that under the loads which arise during assembly and use of the system, the hanger member tends to lever on the bottom edge of the plate and causes the plate to pivot around its upper edge. As a result of this action, the tangs at the lower end portion of the plate are drawn out of the board, and under certain circumstances, this may cause the entire plate to twist out of the board.

An object of the invention is to provide a suspension assembly which overcomes the above disadvantages.

SUMMARY OF THE INVENTION

According to the present invention, there is provided a suspension assembly for suspending a gypsum board panel from a support member of a support structure, said suspension assembly comprising: a plate having upper and lower portions, means defining a transverse line of weakness between the upper and lower portions, and a plurality of panel-piercing members extending outwardly from one face of the plate; and a suspension clip, said clip having an upper portion attached to the plate above the line of weakness and said clip having a lower portion defining a cam surface arranged to engage over the support member, whereby when the panel is suspended from the structure the load applied between the clip and the plate causes the lower plate portion to bend about said line of weakness in a sense to incline the panel piercing members of the lower plate portion in an upwards direction.

This bending of the plate as may occur when light hammer blows are applied to tap the panel into position in the support structure, inclines the panel-piercing members of the lower plate portion in such a direction that the applied loads thereafter act to push these members into tighter engagement with the panel.

In a preferred embodiment of the invention, the clip is attached to the plate by engagement in a vertical channel formed in the plate between the upper and lower portions. The line of weakness is preferably defined by a pair of aligned cuts or other notches formed in the opposed side edges of the plate slightly beneath the lower end of the channel. A second line of weakness may be similarly formed slightly above the upper end of the channel. This second line of weakness enables the plate to bend in such a manner that the upper portion of the plate remains in firm contact with the panel without being inclined thereto.

DESCRIPTION OF THE PREFERRED EMBODIMENT

Figure 1:
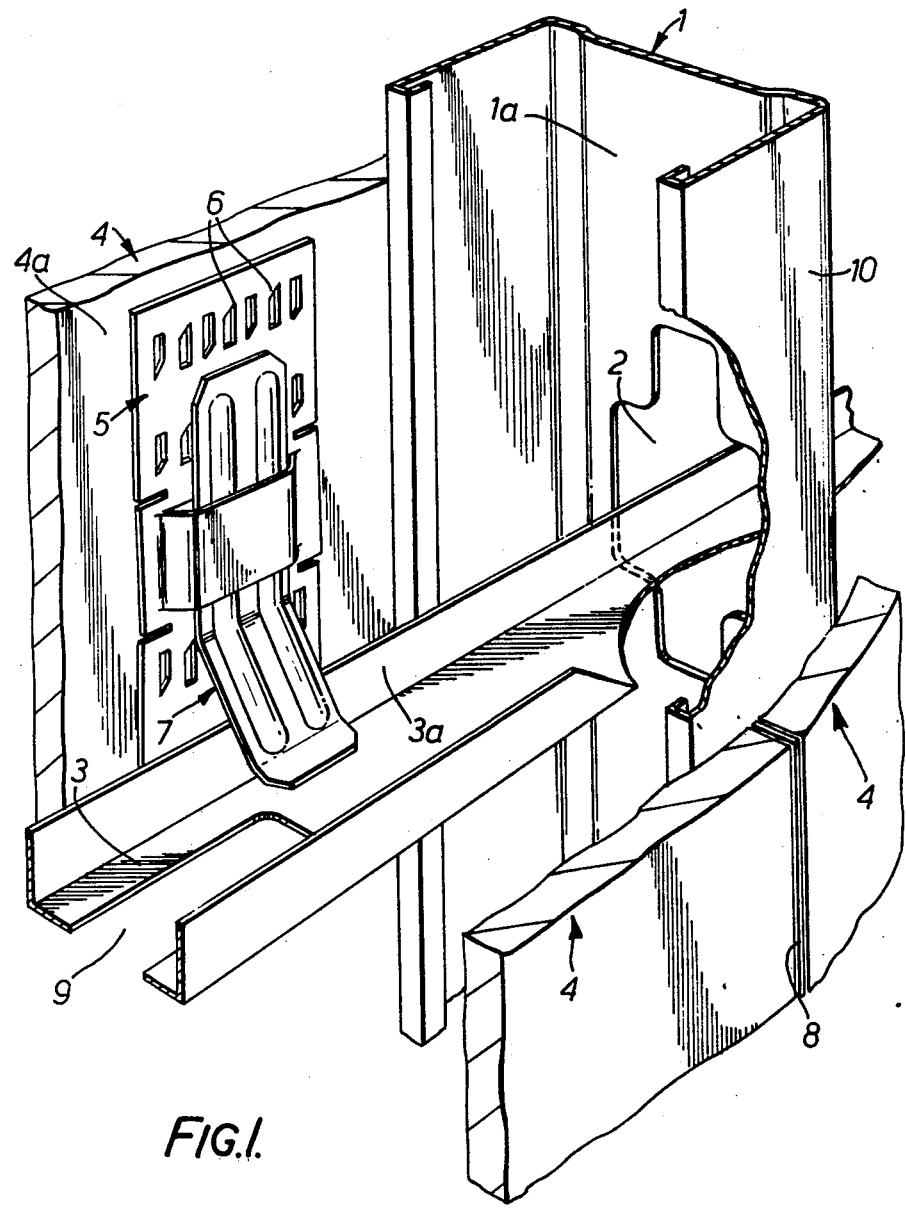
FIG. 1 is a partly broken away, perspective view of a wall comprising gypsum board panels suspended from a framework with the aid of suspension assemblies in accordance with the invention.

With reference to FIG. 1, a vertical stud 1 is shown having a cut-out 2 formed in its web portion 1a. A reinforcing channel member 3 extends through the cut-out 2. Gypsum board panels 4 are suspended from the reinforcing channel member 3 by suspension assemblies each comprising a gang nail plate 5 affixed by tangs 6 driven into the back 4a of the panel 4. A removable hanger member in the form of a spring clip 7 is attached to the gang nail plate 5 and extends over a leg 3a of the reinforcing channel member 3. The panels 4 are easily installed on the completed stud and reinforcing channel member structure by lifting the panels 4 so that the clips 7 engage in channel 3. Similarly, the panels may be removed from the structure simply by lifting the panels. It will be seen that this method of panel support, in addition to providing a wall or partition structure of superior structural stability, allows lateral shifting of the panels 4 together with the clips 7. This is useful for accommodating dimensional variations that can occur during installation, while at the same time obtaining tight abutment of the adjoining panels.

The stud 1 and reinforcing channel member 3 can be left exposed while electrical, telephone and other services are installed within the stud cavity in conventional manner. Cut-out 9 is provided in the horizontal reinforcing channel 3 in order to facilitate vertical wiring or servicing.

Figure 2:
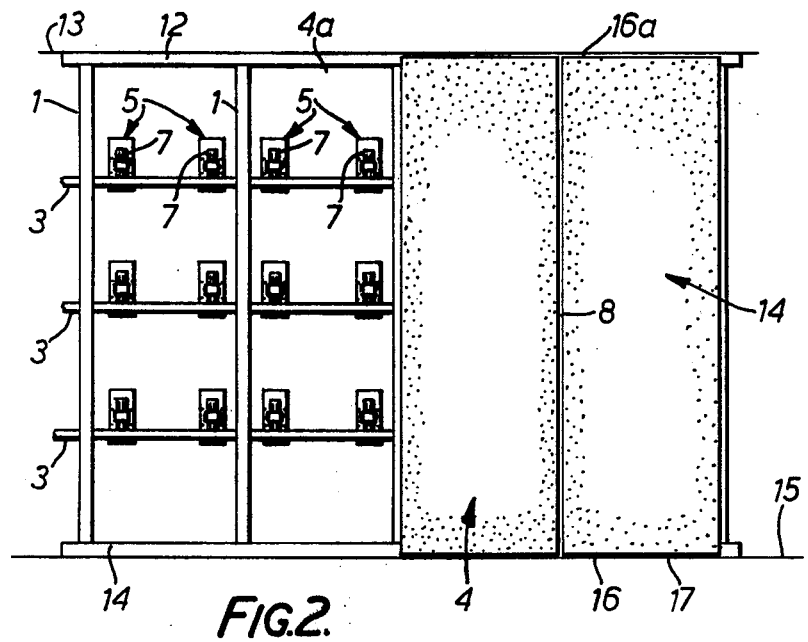
FIG. 2 is a fragmentary elevation of the wall with some of the panels removed to show the framework.

FIG. 2 illustrates more specifically the relationship between the basic reinforced stud structure and the mounted panels 4. Ceiling runner channel 12 is fastened to the floor 15. Studs 1 are fitted into channels 12 and 14 in a laterally spaced, vertical manner and reinforcing channel members 3 are laid horizontally into the studs 1 through the cut-outs 2. It can be seen that the location of the plates 5 and the clips 7 on the back 4a of the panel allows for lateral adjustment of the panel without any special fitting. In addition, it is possible to cut a substantial portion or vertical piece off the sides of the panel 4 without the need to re-locate the plates 5 or clips 7. It can also be seen that a space 16 is left between the bottom edge 17 of each panel 4 and the floor 15, so that the panel is suspended by the clips and is held tight to the face 10 of the vertical stud 1. Panel joints 8 are therefore flat and true without one panel edge projecting beyond the other. The space 16 and a similar space 16a between the top edge of the panel and the ceiling 13 are easily concealed with horizontal trim applied at the ceiling 13 and floor 15.

When the clips 7 are engaged in the reinforcing channel member 3, the backs of the panels 4 lay tight up against the face 10 of the stud 1. If required, for special joint affects, the panels 4 can be shifted laterally to allow for the application of feature strip material.

Figure 3:
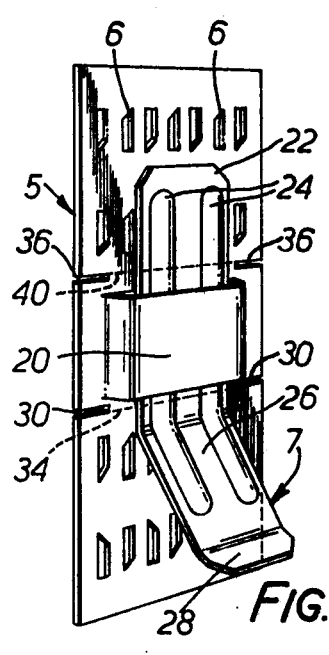
FIG. 3 is a perspective view of a suspension assembly in accordance with the invention.

FIG. 3 shows the detailed construction of the gang nail plate 5 and clip 7. The plate 5 is of elongate rectangular form and comprises a plurality of integral projecting tangs 6, which are driven into the rear face of the panel 4. Two, parallel, transverse slots are formed in the central portion of the plate 5 to extend part-way across the width of the plate 5 and the part of the plate between these slots is pressed out to form a channel 20 which receives the clip 7.

The clip 7 comprises a rectilinear upper portion 22 which passes through the channel 20 and which is provided with projecting ribs 24 arranged to engage the adjacent face of the plate 5. The channel 20 and the ribs 24 serve to attach rigidly the clip 7 to the plate 5. Beyond the lower end of the channel 20, the clip 7 is provided with an outwardly inclined cam portion 26 which provides a camming action as the clip 7 engages the leg 3a of the channel member 3 to pull the panel 4 tightly against the stud face 10. The lower end portion of the clip 7 is outwardly flared at 28 to facilitate engagement of the clip with the channel leg 3a.

The tangs 6 are formed in transverse rows by punching the tangs out of the plate 5, and to enable the tangs 6 to be driven easily in the panel 4, the tangs are directed substantially perpendicularly to the plane of the plate 5.

The plate 5 is provided with a first line of transverse weakness adjacent the lower end of the clip-receiving channel 20. This line of weakness maybe formed by cutting in the plate 5, two aligned notches 30 which extend inwardly from the opposed side edges of the plate 5 to positions slightly below the adjacent ends of the lower channel-defining slot. The line of weakness lies along a transverse line passing through the notches 30. The plate 5 can be bent relatively easily or preferentially about this line, which is shown by a dotted line in FIG. 3 and is designated 34. The plate 5 is also provided with a second line of transverse weakness adjacent the upper end of the clip-receiving channel 20. This second line of weakness may be formed by a second pair of aligned notches 36 cut into the opposed side edges of the plate 5. The second line of weakness is marked by the dotted line 40 in FIG. 3.

These lines of weakness act in a surprising manner to improve anchorage of the gang nail plate 5 to the gypsum panel 4 under the applied loads and provides an effective anchorage even with gypsum panels of relatively low density. The manner in which this is achieved will now be described with reference to FIG. 4.

Figure 4:
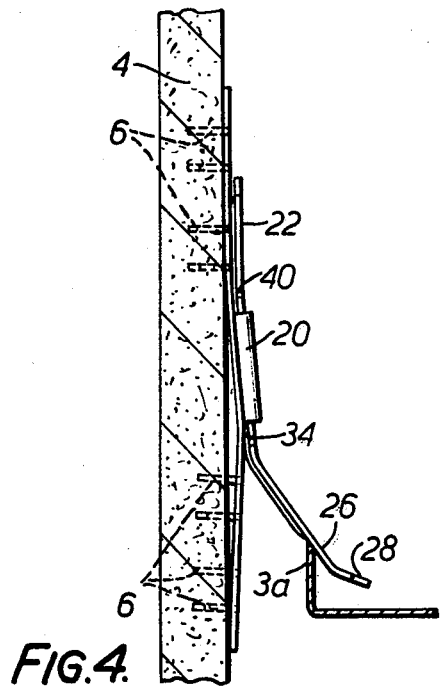
FIG. 4 is a vertical section illustrating the manner in which a plate of the suspension assembly bends during use.

When the clip 7 is engaged with the channel leg 3a and the clip 7 is under load from the weight of the panel 4 and also from light hammer blows which are used to force the panel 4 into its correct position, the force acting on the clip 7 is transmitted via the clip portion 22 to the plate 5 and causes the plate to bend about the two transverse lines of weakness 34, 40. The lower portion of the plate 5 bends about the lower line of weakness 34 in a sense to withdraw slightly the upper tangs of this portion from the panel 4 as is illustrated in FIG. 4. Thereafter, due to the slightly inclined configuration of the lower plate portion, the forces acting on the tangs of this portion tend to push these tangs upwardly into tighter engagement with the panel thereby precluding any further withdrawal from the panel even under severe loading when hammer blows are repeatedly applied. Additionally, the upper plate portion bends about the upper line of weakness 40 so that this plate portion remains in firm contact with the panel.

The above-described bending of the plate provides a very effective holding action of the plate with a gypsum panel.

Although this invention, has been described with respect to its preferred embodiment, it should be understood that many variations and modifications will be obvious to those skilled in the art and that the invention is not limited to the specific form or uses mentioned, except to the extent of the appended claims.

What is claimed is:

1. A suspension assembly for suspending a gypsum board panel from a support member of a support structure, said suspension assembly comprising:

a plate having upper and lower portions, means defining a transverse line of weakness between the upper and lower portions so that the plate preferentially bends along the line, and a plurality of panel-piercing members extending outwardly from one face of the plate; and a suspension clip, said clip having an upper portion attached to the plate above the line of weakness and said clip having a lower portion defining a cam surface arranged to engage over the support member, whereby when the panel is suspended from the structure the load applied between the clip and the plate causes the lower plate portion to bend about said line of weakness in a sense to incline the panel-piercing members of the lower plate portion in an upwards direction.

2. A suspension assembly for suspending a gypsum board panel from a channel member of a supporting structure, said suspension assembly comprising:

a plate having upper and lower portions, means defining a channel extending between said upper and lower plate portions and having open upper and lower ends, means defining a transverse line of weakness in the plate at the upper end of the lower plate portion so that the plate preferentially bends along the line, and a plurality of panel-piercing members extending outwardly from one face of the upper and lower portions of the plate; and a separate suspension clip, said clip having an upper portion inserted through the channel to engage the upper plate portion, and a lower portion overlying the lower plate portion, said lower clip portion being inclined outwardly from the plane of the lower plate portion to engage over a side leg of the channel member whereby when the panel is suspended from the channel member, the load applied between the plate and the clip causes the plate to bend about the line of weakness in a sense to force the panel piercing members of the lower plate portion in an upwards direction.

3. The suspension assembly as set forth in claim 2, wherein:

the plate has means defining a second transverse line of weakness at the lower end of the upper plate portion, whereby when the panel is suspended from the channel member the applied loads cause the plate also to preferentially bend about the second line of weakness so that the upper plate portion lies in engagement with the panel throughout substantially the entire length of the upper plate portion.

4. The suspension assembly as set forth in claim 2 wherein:

the plate has opposed side edges and the line of weakness is defined by a pair of aligned notches cut into the opposed side edges.

5. The suspension assembly as set forth in claim 3, wherein:

the plate has opposed side edges and the two lines of weakness are defined by respective pairs of aligned notches cut into the opposed side edges.

6. The suspension assembly as set forth in claim 4, wherein:

the plate has upper and lower parallel slots extending between the side edges with each end of each slot being spaced from an adjacent side edge of the plate, the upper and lower slots respectively defining the upper and lower ends of the channel, the portion of the plate lying between the slots is pressed out from the plane of the plate to form the channel, and the notches forming the line of weakness are located on a line lying beneath the lower slot.

7. The suspension assembly as set forth in claim 5, wherein:

the plate has upper and lower parallel slots extending between the side edges with each end of each slot being spaced from an adjacent side edge of the plate, the upper and lower slots respectively defining the upper and lower ends of the channel, the portion of the plate lying between the slots is pressed out from the plane of the plate to form the channel, the notches forming the first line of weakness are located in a line lying beneath the lower slot, and the notches forming the second line of weakness are located on a line lying above the upper slot.

8. In combination:

a gypsum board panel; and a plurality of suspension assemblies attached to the panel at its rear face for suspending the panel from a channel member of a support structure, each said suspension assembly comprising;

a plate having upper and lower portions, means defining a transverse line of weakness between the upper and lower portions so that the plate preferentially bends along the line, and a plurality of panel-piercing members projecting outwardly from one face of the upper and lower portions of the plate and extending into the panel, without protruding through the front face thereof, to secure the plate to the panel, and a suspension clip, said clip having an upper portion attached to the plate above the line of weakness and said clip having a lower portion which overlies the lower portion of the plate, said lower clip portion defining a cam surface arranged to engage over a side leg of the channel member, whereby when the panel is suspended from the channel member, the load applied between the plate and the clip causes the plate to bend about the line of weakness in a sense to incline the panel piercing members of the lower plate portion in an upwards direction.

9. The combination as set forth in claim 8, wherein:

the plate comprises a vertically-directed channel extending between the upper and lower plate portions, the upper portion of the clip passes through the channel to engage the upper portion of the plate, and the line of weakness is defined by a pair of aligned notches formed in the opposed side edges of the plate, said notches being located on a line lying slightly below the lower end of the channel.

10. The combination as set forth in claim 9 wherein:
the plate comprises means defining a second line of weakness located slightly above the upper end of the channel, said second line of weakness being defined by a second pair of aligned notches formed in the opposed side edges of the plate.

11. A building partition wall comprising:
first and second runner members mounted horizontally on a ceiling and floor respectively in confronting relationship;
a plurality of spaced, vertical stud members extending longitudinally between the runner members and co-operating therewith to form a rigid framework, each stud member having at least one cut-out extending therethrough, said cut-out in one stud member being aligned with a cut-out in each other stud member;
at least one horizontal channel member extending through a series of aligned cut-outs and having an upwardly extending side leg;
a plurality of gypsum board panels, each suspended in sid-by-side relationship from the horizontal channel member; and
a plurality of suspension assemblies affixed to the rear of each panel in spaced relationship, said suspension assemblies suspending the panel from said channel members,
each said suspension assembly comprising,
a gang nail plate, and
a separate suspension clip,
the plate comprising upper and lower portions, means defining a transverse line of weakness between the upper and lower portions so that the plate preferentially bends along the line, and a plurality of panel-piercing members projecting outwardly from one face of the upper and lower portions of the plate and extending into the panel, without protruding through the front face thereof, to secure the plate to the panel, and
the suspension clip having an upper portion attached to the plate above the line of weakness, and said clip having a lower portion, which overlies the lower portion of the plate, the lower portion of the clip defining a cam surface which co-operates with a side leg of the channel member from which it is suspended to draw the panel firmly against the vertical stud members, said line of weakness enabling the plate to bend about said line under the applied loads in a sense to incline the panel-piercing members of the lower plate portion in an upwards direction.

12. The building partition wall as set forth in claim 11, wherein:
each plate comprises a vertically-directed channel extending between the upper and lower plate portions, the upper portion of the clip passes through the channel to engage the upper portion of the plate, and the line of weakness is defined by a pair of aligned notches formed in the opposed side edges of the plate, said notches being located on a line lying slightly below the lower end of the channel.

13. The building partition wall as set forth in claim 12, wherein:
each plate comprises means defining a second line of weakness located slightly above the upper end of the channel, said second line of weakness being defined by a second pair of aligned notches formed in the opposed side edges of the plate.

* * * * *